May 6, 1924.

S. T. STEEL

ATTACHMENT FOR TRACTORS

Filed July 15, 1922  4 Sheets-Sheet 1

1,493,401

Samuel T. Steel.
INVENTOR

BY Victor J. Evans
ATTORNEY

WITNESS:

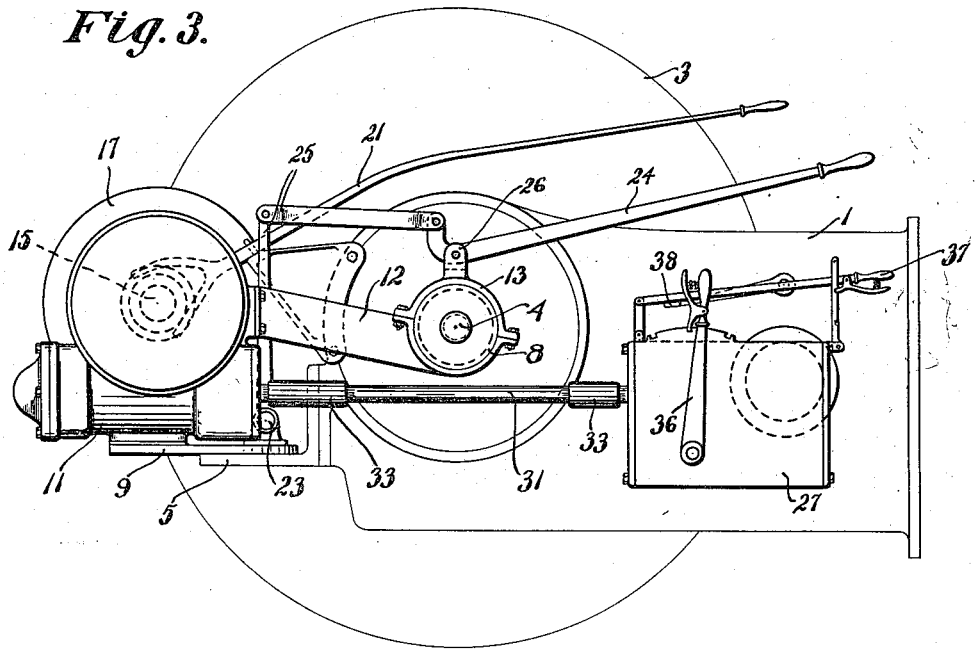
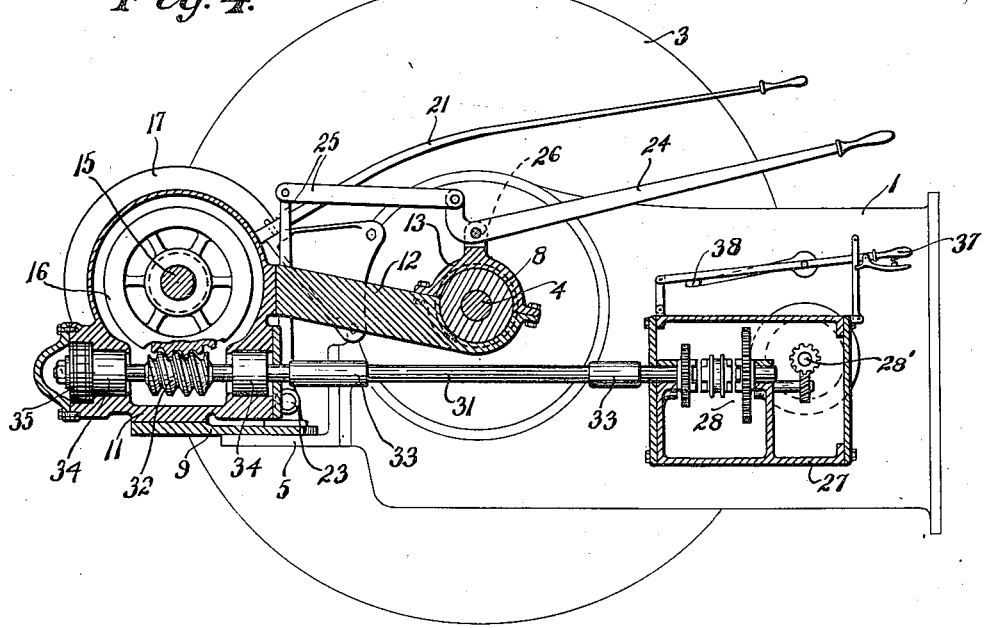

May 6, 1924.

S. T. STEEL

ATTACHMENT FOR TRACTORS

Filed July 15, 1922    4 Sheets-Sheet 3

1,493,401

Samuel T. Steel.
INVENTOR

BY Victor J. Evans.
ATTORNEY

WITNESS:

May 6, 1924.

S. T. STEEL

ATTACHMENT FOR TRACTORS

Filed July 15, 1922 4 Sheets-Sheet 4

1,493,401

Samuel T. Steel.
INVENTOR

BY Victor J. Evans
ATTORNEY

WITNESS:

Patented May 6, 1924.

1,493,401

UNITED STATES PATENT OFFICE.

SAMUEL T. STEEL, OF BARTLESVILLE, OKLAHOMA.

ATTACHMENT FOR TRACTORS.

Application filed July 15, 1922. Serial No. 575,172.

*To all whom it may concern:*

Be it known that I, SAMUEL T. STEEL, a citizen of the United States, residing at Bartlesville, in the county of Washington and State of Oklahoma, have invented new and useful Improvements in Attachments for Tractors, of which the following is a specification.

This invention relates to improvements in tractors, the general object of the invention being to provide an attachment whereby a shaft can be driven from the power plant of the tractor and used to transmit power to some other device without interfering with the ordinary use of the tractor.

Another object of the invention is to make the attachment easily detachable and to provide means whereby the auxiliary shaft may be driven at different speeds without changing the speed of the main shaft of the tractor plant.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is a side view thereof.

Figure 4 is a longitudinal sectional view.

Figure 1:
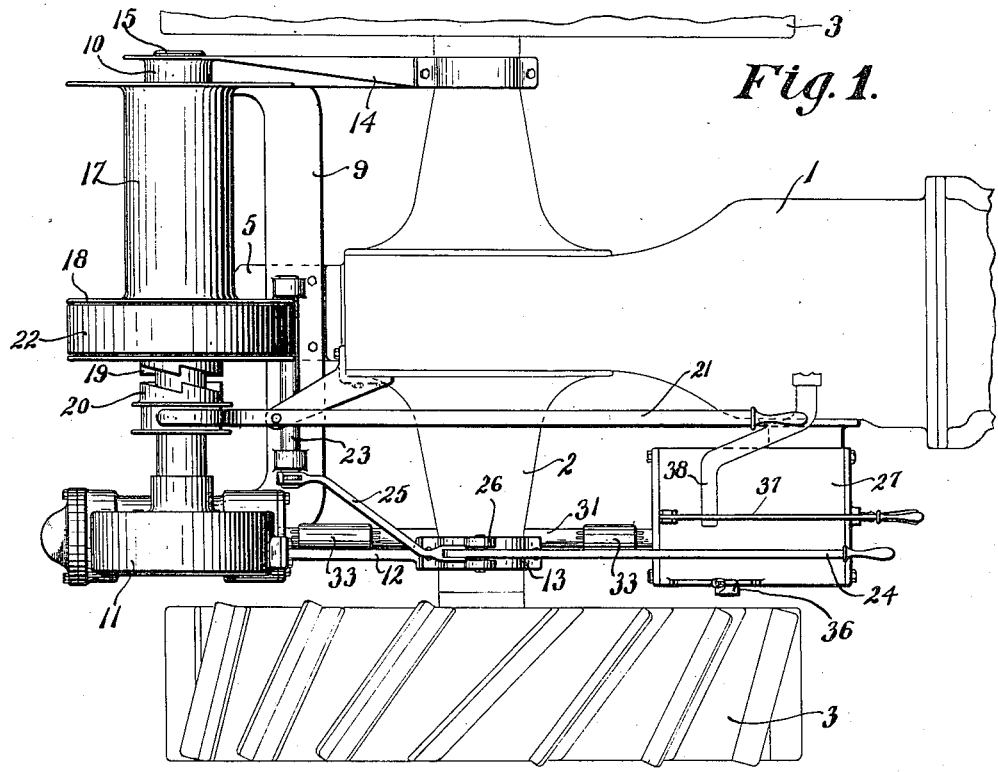
Figure 1 is a plan view of a tractor showing my invention in use.
Figure 2:
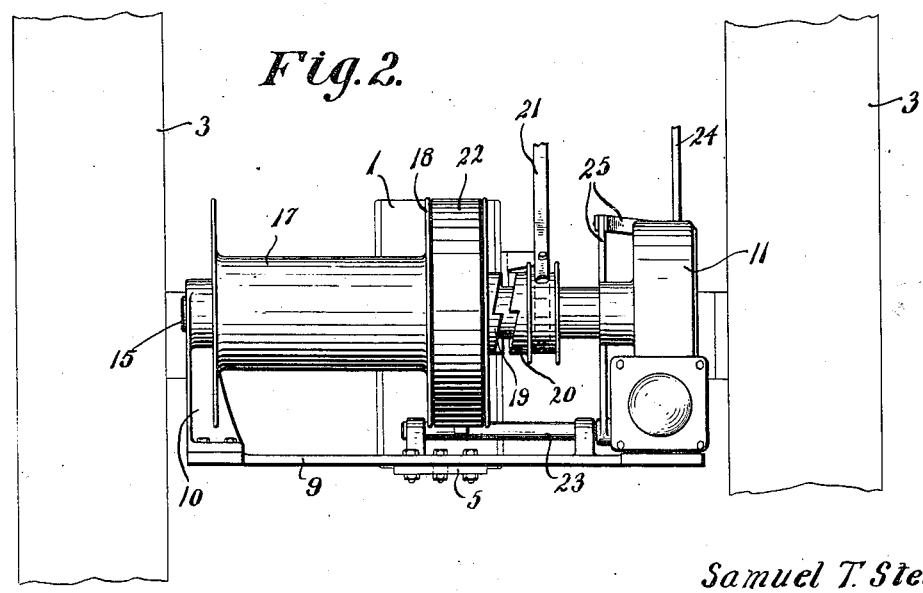
Figure 2 is a rear view of Figure 1.
Figure 5:
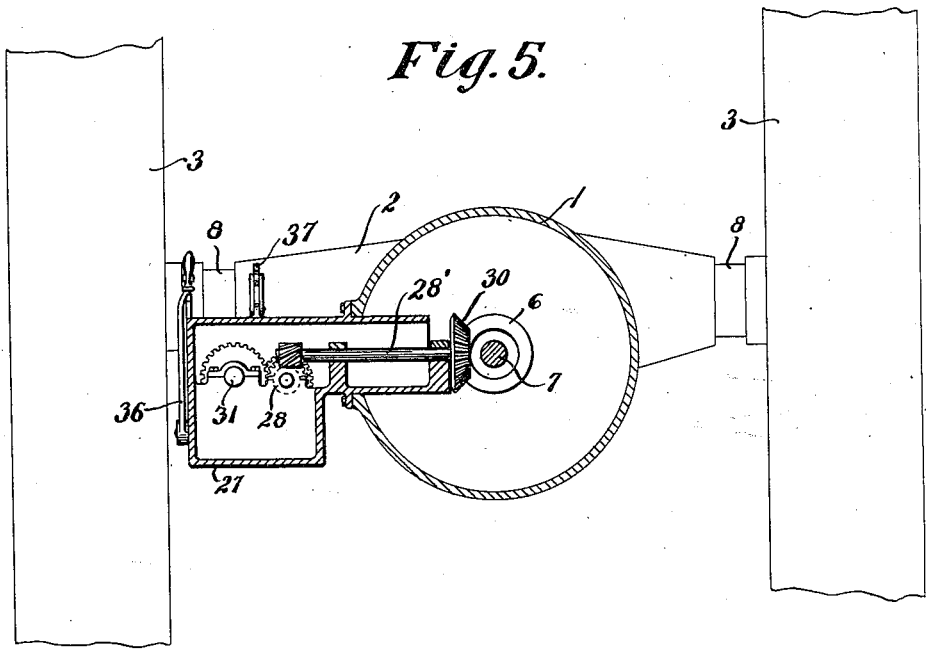
Figure 5 is a transverse sectional view taken through the housing 27.
Figure 6:
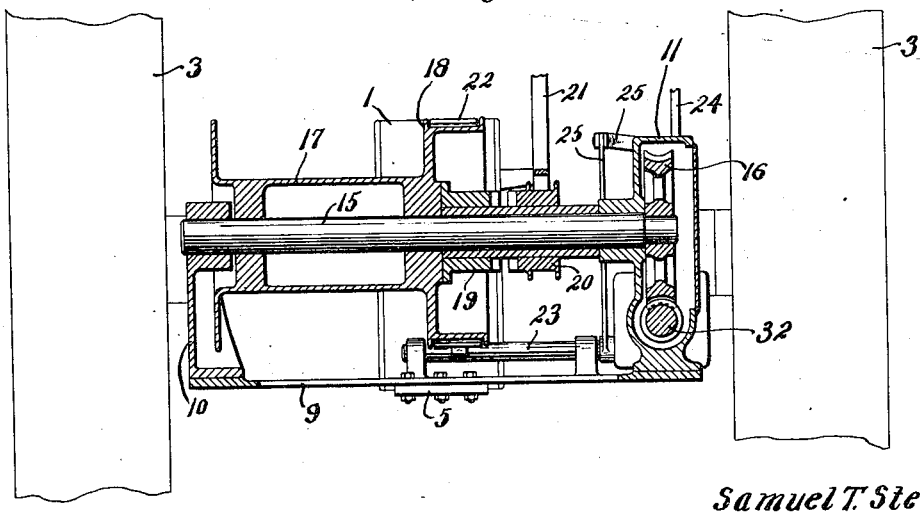
Figure 6 is a transverse sectional view through the driven shaft 15 and its associated parts.
Figure 7:
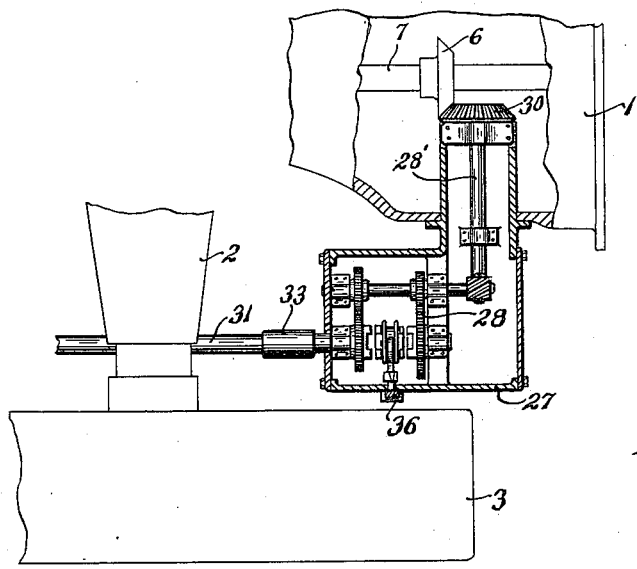
Figure 7 is a horizontal sectional view through the auxiliary transmission means.
Figure 8:
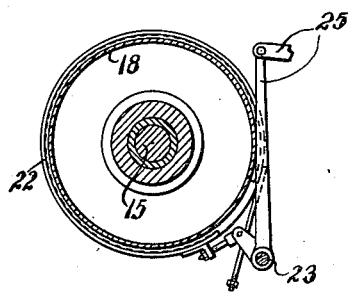
Figure 8 is a detail sectional view of the brake means.

In these views, 1 indicates the frame of the tractor, 2 the rear axle housing, 3 the rear wheels which are connected with the rear axle 4, 5 the draw-bar at the rear of the frame, 6 a bevel pinion on the driving shaft 7 which leads to the main transmission and 8 are grooves formed in the housing 2, adjacent the ends thereof. These parts constitute parts of a tractor as now constructed.

In carrying out my invention, I place a cross-plate 9 on the draw-bar 5, this plate supporting at one end the standard 10 and at its other end the housing 11. The housing is connected by a brace 12 with the rear axle housing 2, the end of the brace having a semi-circular part engaging the groove 8 in the housing 2 and a cap part 13 also engages the groove and is bolted to the part of the brace which engages the groove. A brace 14 has one end engaging the opposite groove in the housing 2 and its other end is connected with the standard 10. The brace 14 also has a cap part for detachably connecting it with the housing 2 so that by removing these cap parts the braces and plate can be removed from the tractor. A shaft 15 is journaled in the standard 10 and the housing 11, a worm wheel 16 being connected with the end of the shaft within the housing and said shaft also carries a drum 17, which is loosely arranged on the shaft. This drum is provided with a brake drum 18 and with a clutch part 19. This part 19 is adapted to be engaged by a sliding clutch part 20 on the shaft, the same being moved by the lever 21, so that the drum may be connected and disconnected with the shaft. The brake drum has its band 22 connected with a shaft 23, mounted in bearings on the plate 9 and this shaft is rocked, to contract the band on the drum, by the hand lever 24 and the links 25, said hand lever being pivoted to an ear 26 on the cap part 13. An auxiliary transmission case 27 is suitably secured to the frame 1, adjacent the right hand wheel thereof, this case containing the transmission shafts and gears, which are indicated generally at 28. The shaft 28' passes from the case and has its end secured to a bevel gear 30 which meshes with the gear 6 on the main drive shaft. A lay shaft 31 has one end geared to the transmission means 28 and its other end carries the worm 32 which meshes with the worm wheel 16. The parts of this shaft are connected together by the splined couplings 33. The worm carrying part of this shaft is provided with the roller bearings 34 and the thrust bearings 35. A hand lever 36 controls the transmission means 28 so that the lay shaft can be driven at different speeds from the main shaft 7 or it can be disconnected from said shaft so that it will remain stationary. A hand lever 37 is pivoted to the case 27 and passes over the foot pedal 38 so that said pedal can be actuated by hand by means of this lever, when desired.

From the foregoing it will be seen that a power shaft is arranged at the rear of the tractor, which may be driven at different speeds from the main drive shaft of the tractor. While the drawings show a drum on this shaft it will of course be understood that other means may be placed on the shaft, such as a pulley or the like for transmitting the power from said shaft to another device. Then entire structure may be easily removed from the tractor when desired or necessary and the drum or pulley can be connected or disconnected to or from the driven shaft by the clutch means without disconnecting the lay shaft from the main drive shaft.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim as new is:—

An attachment for tractors comprising auxiliary transmission means geared to the drive shaft of the tractor, a lever for controlling such means, a lay shaft connected with the transmission means, a structure at the rear of the tractor including a housing, a standard, a plate supporting the same and resting on the draw bar of the tractor and braces connecting the housing and standard with the rear axle housing of the tractor, a shaft journaled in the housing and standard and gears connecting the said shaft with the lay shaft, said gears being located within the housing.

In testimony whereof I affix my signature.

SAMUEL T. STEEL.